United States Patent
Sitaram et al.

(10) Patent No.: US 11,026,146 B1
(45) Date of Patent: Jun. 1, 2021

(54) METHOD AND SYSTEM FOR OVERCOMING HANDOVER FAILURES BETWEEN MINI MACROS

(71) Applicant: Sprint Spectrum LP, Overland Park, KS (US)

(72) Inventors: Krishna Sitaram, Chantilly, VA (US); Hemanth Pawar, Brambleton, VA (US); Shilpa Kowdley Srinivas, Brambleton, VA (US)

(73) Assignee: T-MOBILE INNOVATIONS, LLC, Overland Park, KS (US)

( * ) Notice: Subject to any disclaimer, the term of this patent is extended or adjusted under 35 U.S.C. 154(b) by 24 days.

(21) Appl. No.: 16/259,293

(22) Filed: Jan. 28, 2019

(51) Int. Cl.
| | | |
|---|---|---|
| *H04W 4/00* | (2018.01) | |
| *H04W 36/30* | (2009.01) | |
| *H04W 36/00* | (2009.01) | |
| *H04W 88/04* | (2009.01) | |
| *H04W 36/08* | (2009.01) | |

(52) U.S. Cl.
CPC ....... *H04W 36/30* (2013.01); *H04W 36/0077* (2013.01); *H04W 36/0085* (2018.08); *H04W 36/08* (2013.01); *H04W 88/04* (2013.01)

(58) Field of Classification Search
CPC ............. H04W 36/30; H04W 36/0055; H04W 36/0094; H04W 36/08; H04W 8/14; H04W 36/0085; H04W 36/0077; H04W 88/04
USPC ........................................................ 370/331
See application file for complete search history.

(56) References Cited

U.S. PATENT DOCUMENTS

| | | | |
|---|---|---|---|
| 9,560,552 B2* | 1/2017 | Li | H04W 36/0069 |
| 9,749,914 B2 | 8/2017 | Chai | |
| 9,877,240 B1* | 1/2018 | Saleh | H04W 36/30 |
| 2010/0118830 A1* | 5/2010 | Stephenson | H04L 63/10 370/331 |
| 2014/0274060 A1* | 9/2014 | Fujishiro | H04W 36/0055 455/436 |
| 2015/0181498 A1* | 6/2015 | Li | H04W 36/0055 455/437 |
| 2017/0302359 A1* | 10/2017 | Guo | H04B 7/155 |
| 2017/0339044 A1* | 11/2017 | Garcia Morchon | H04L 12/185 |
| 2018/0084442 A1* | 3/2018 | Lee | H04L 5/0048 |
| 2019/0274076 A1* | 9/2019 | Kim | H04W 36/0058 |
| 2019/0319686 A1* | 10/2019 | Chen, IV | H04W 72/046 |
| 2020/0092766 A1* | 3/2020 | Alriksson | H04W 36/0072 |

\* cited by examiner

*Primary Examiner* — Faisal Choudhury

(57) ABSTRACT

A method of managing handovers between a plurality of relay access nodes, the method includes monitoring a latency of a donor access node communicating with the plurality of relay access nodes; determining that a quality of service corresponding to a wireless device communicating with a relay access node of the plurality of relay access nodes meets a quality of service criteria; and in response to the latency meeting a threshold, instructing the relay access node to handover the wireless device to a target access node, or instructing the donor access node to handover the relay access node to the target access node, where the target access node is the donor access node, a neighboring access node, or a second relay access node served by the neighboring access node.

14 Claims, 7 Drawing Sheets

METHOD AND SYSTEM FOR OVERCOMING HANDOVER FAILURES BETWEEN MINI MACROS

TECHNICAL BACKGROUND

As wireless networks evolve and grow, there are ongoing challenges in providing high-quality service to increasing numbers of wireless devices or user equipment (UE) in various coverage areas of a wireless network. One approach to improving service quality and coverage is to deploy small access nodes, such as mini-macro access nodes (or "mini-macros") that function as a relay node for relaying communication from a macro base station or eNodeB, that functions as a donor access node, to an end-user wireless device. Relay nodes may be used at the edge of a coverage area of a donor access node to improve coverage and/or service, as well as in crowded areas having a high number of other wireless devices to increase the available throughput to the end-user wireless devices being relayed. However, relay nodes may be limited in their ability to effectively service end-user wireless devices that are attached to it, particularly if there is a latency or a processing delay due to an excess load on the donor access node.

OVERVIEW

Exemplary embodiments described herein include systems, methods, and processing nodes for overcoming handover failures between mini macros. A method of managing handovers between a plurality of relay access nodes, the method includes monitoring a latency of a donor access node communicating with the plurality of relay access nodes; determining that a quality of service corresponding to a wireless device communicating with a relay access node of the plurality of relay access nodes meets a quality of service criteria; and in response to the latency meeting a threshold, instructing the relay access node to handover the wireless device to a target access node, or instructing the donor access node to handover the relay access node to the target access node, where the target access node is the donor access node, a neighboring access node, or a second relay access node served by the neighboring access node.

According to an embodiment, a method of managing traffic between relay access nodes communicating with a donor access node, the method includes determining a latency of the donor access node communicating with a first relay access node and second relay access node; determining a quality of service corresponding to a wireless device communicating with the first relay access node meets a quality of service criteria; determining a handover condition of the wireless device meets a handover criteria; and preventing the second relay access node from serving as a candidate target access node for the wireless device.

According to an embodiment, a system for managing traffic between relay access nodes communicating with a donor access node, the system including: a donor access node for providing network services to an end-user wireless device; a first relay access node for relaying the network services between the donor access node and the end-user wireless device; and a processor communicatively coupled to the donor access node, the processor configured to. The system also includes determine a quality of service corresponding to the end-user wireless device meets a quality of service criteria. The system also includes determine a second relay access node is communicating with the donor access node. The system also includes receive an indication of an initiation of a handover of the end-user wireless device to a candidate target access node. The system also includes prevent the second relay access node from serving as the candidate target access node.

DETAILED DESCRIPTION

In embodiments disclosed herein, a determination that a plurality of relay nodes is served by the same donor access node is made. The plurality of relay nodes served by the same donor access node may cause latencies within the network due to processing delays at the donor access node due communication with relay access nodes. Two relay nodes served by the same donor access node may have similar latencies. These latencies may negatively affect a quality of service of end-user wireless devices communicating with the relay access nodes. When the quality of service of an end-user wireless device meets a quality of service criteria, the end-user wireless device may initiate a handoff to a candidate target access. While the neighboring relay access node served by the same donor access node may be a candidate target access node, it may also be experiencing a latency. Accordingly, if a wireless device were to be handed off from a first relay node served by a first donor access node to a second relay node served by the same first donor access node, the end-user wireless device may experience a similar latency. Thus, a second handoff may be initiated. This may cause the end-user wireless device to be repeatedly handed off between the two relay access nodes being served by the same donor access node, causing additional load on the donor access node and latencies within the network.

According to an aspect of the disclosure, an end-user wireless device is prevented from being handed over between relay access nodes being served by the same donor access node. In other words, the end-user wireless device or relay access node looks for a candidate target access node which is not being served by the same donor access node. The candidate target access node may be a neighboring access node, e.g., Evolved Node B ("eNB"), or a relay access node which is served by the neighboring donor access node. For example, the service criteria may correspond to a guaranteed bit rate, voice call traffic, or real-time traffic. Upon triggering of a handoff, of the end-user wireless device from the access node or cell it is currently attached to, i.e. the relay node, to the access node with the stronger signal/frequency band, i.e. the target access node. The target access node can be the donor access node, or any neighbor thereof. Such a movement of one or more end-user wireless devices from the serving cell to another access node helps to alleviate the resource utilization of the relay backhaul, the air-interface of the donor access node, and reduce latencies experienced by an end user. Moreover, such offloading is particularly beneficial in situations where more than one relay access nodes are coupled to a donor access node. These and additional operations are further described with respect to the embodiments depicted in FIGS. 1-8 below.

Figure 1:
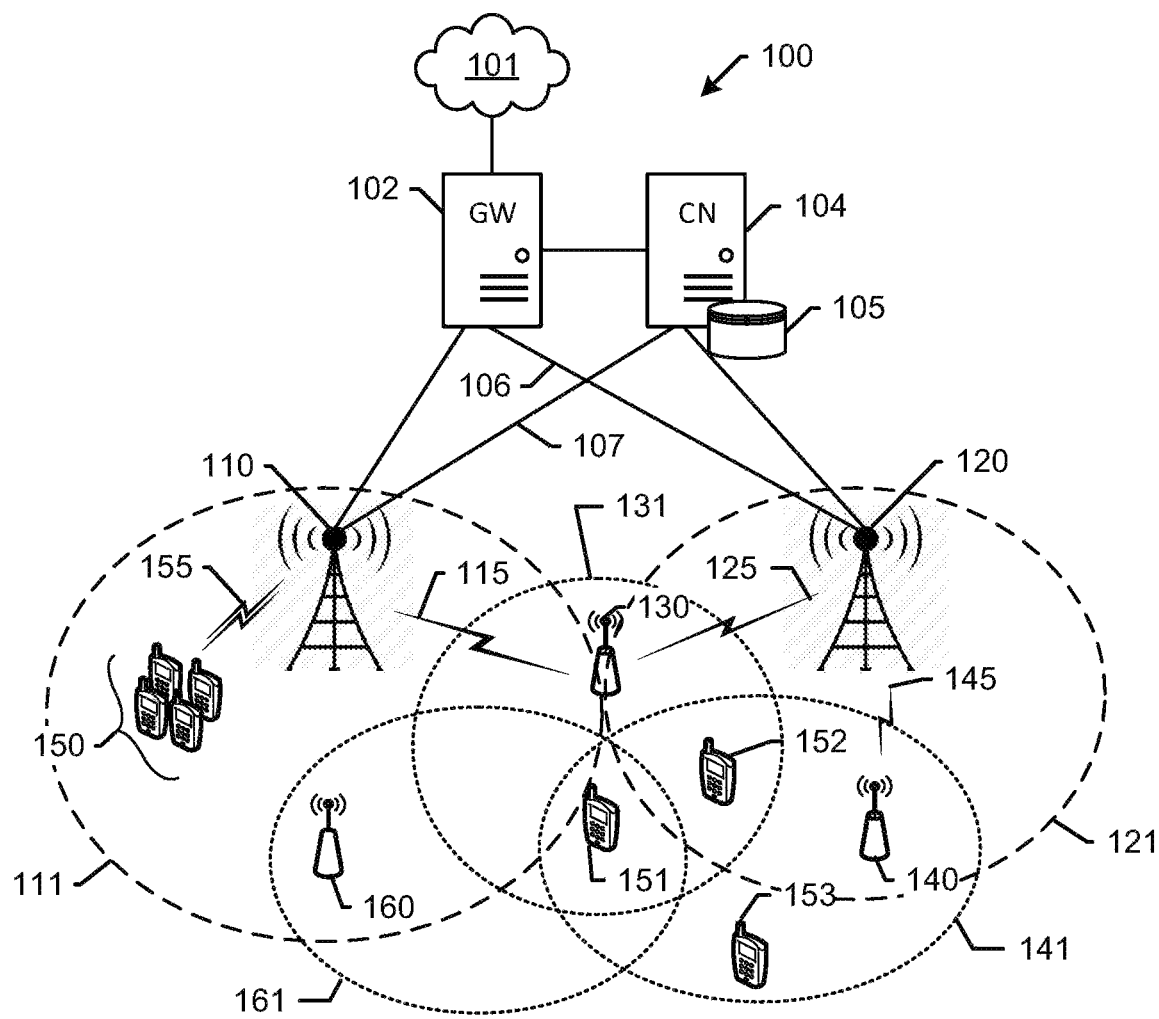
FIG. 1 depicts an exemplary system for overcoming handover failures between mini macros.

FIG. 1 depicts an exemplary system 100 for managing handovers of wireless devices. System 100 comprises a communication network 101, gateway 102, controller node 104, access nodes 110 and 120, relay nodes 130, 140, and 160, and end-user wireless devices 150, 151, 152, and 153. Access node 110 is illustrated as having coverage area 111, and access node 120 is illustrated as having coverage area 121. Relay node 130 is located within coverage areas 111 and 121 and is illustrated as having its own coverage area 131. Relay node 130 acts as a wireless access point for end-user wireless devices 151 and 152, relaying services to said end-user wireless devices from access node 110 via air interface 115, also referred to herein as a relay backhaul air interface, or simply "backhaul". Alternatively, or in addition to, relay node 130 can relay services to the end-user wireless devices from access node 120 via air interface 125, also referred to herein as a relay backhaul air interface, or simply "backhaul". Consequently, access nodes 110 and 120 may be referred to as donor access nodes. Further, end-user wireless devices 150 are located within coverage area 111 and access network services directly from access node 110 via air interface(s) 155. End-user wireless device 151 is located within coverage areas 111, 131, 141, and 161, and can access network services from access node 110, or relay nodes 130, 140, or 160. The end-user wireless device 151 may access network services from the relay nodes in order to alleviate a load on air interface 155. End-user wireless device 152 is located outside coverage area 111 and within coverage areas 121, 131, and 141, thus, is able to access network services from access node 110 relayed via relay node 130, directly from access node 120 or from access node 120 relayed via relay node 140. End-user wireless device 153 is located within coverage area 141 and is able to access network services from access node 120 relayed via relay node 140.

In operation, donor access node 110 may monitor usage of its air interface (comprised by any combination of at least links 155 and 115 among others), and may determine that the air interface is congested. For instance, a usage of the air interface may reach a predefined configurable threshold. Usage may be determined using a physical resource block (PRB) utilization, amount of signaling, utilization or signaling per unit of time over a configurable timeframe, or any metric that may be evident to persons having ordinary skill in the art in light of this disclosure. Upon determining that the usage or utilization exceeds the threshold, donor access node 110 determines whether there are any relay nodes being served by its air interface. This may be performed based on a separate public land mobile network (PLMN) identifier assigned to relay node 130. Alternatively, or in addition, a separate quality of service (QoS) class identifier, or QCI, may be assigned to relay node 130, thereby enabling identification of relay node 130. Further, access node 110 may determine that backhaul link 115 of relay node 130 is contributing heavily to the congestion, perhaps by using excessive resources of donor access node 110. This may be determined using a physical resource block (PRB) utilization. For example, a metric may be defined of PRB utilization per QCI to determine the contribution of link 115 to the congestion. The resource utilization of backhaul link 115 can be compared with a threshold. If the utilization is excessive or if it exceeds the threshold, it may cause a latency at a donor access node 110, relay nodes 130, 160, or wireless devices 150, 151, 152 attached to access node 110 or relay nodes 130, 160.

Latency is a time between a transmission and receipt of a communication between nodes in the system 100. For example, latency could be the average time between a transmission of a data packet and a reception of an acknowledgment of the transmission. The data packet could be transmitted from the access node 110 or relay access node 130 to the wireless device 151,152. The wireless device 151,152 could send an acknowledgment, such as a hybrid automatic repeat request (HARD) ACK/NACK, which is received by the access node 110, 120 or relay access node 130, 140. The relay access node 130 as well as other network nodes may also send the data packet and/or acknowledgement, such as a gateway node, controller node, etc., in the system 100. The access node 110, 120 or relay access node 130, 140 can determine the time difference between the transmission of the data packet and the receipt of the acknowledgment. The time difference can also be measured on the downlink or uplink portion of a communication. The latency can be used to manage traffic between relay access nodes communicating with a donor access node.

Latency may also be measured by access node 110, 120 requesting wireless device 151, 152 to send a sounding reference signal (SRS) to determine the latency on the uplink communication links either via relay node 130, 140. As would be understood, greater latency is to be expected in the uplink due to greater processing required at relay node 130, 140 and/or access node 110, 120 as traffic comes in from wireless devices 151, 152.

Alternatively, or in addition, a latency may be determined by the system 100 based on channel quality indicators (CQI). The CQI's may be, for example, signal to noise ratio (SNR), block error rates (BLER) or modulation coding scheme (MCS). For example, access nodes 110, 120, relay nodes 130, 140, 160 or wireless devices 151, 152, 153 may compare a latency with a threshold or criteria. The threshold may be based on a QoS or CQI of the wireless device 151, 152, 153. The QoS or CQI may correspond to guaranteed bit rate (GBR), voice call traffic, or real-time traffic. If the latency meets the threshold, the donor access node 110, or relay access node 130, may determine to handover or offload one or more wireless devices 151, 152 from relay access node 130 to other access nodes such as donor access node 110, neighbor access node 120, or relay access node 140.

Alternatively, or in addition, if the latency meets the threshold, the access node 110 may determine to handover or offload relay node 130 to another donor access node such as neighbor access node 120. Prior to the handover of relay node 130 to neighboring access node 120, the relay node 130 determines the capabilities of access node 120 to determine if it can serve as a donor access node for relay node 130 and the wireless devices 151, 152.

To achieve this, relay node 130 transmits updated measurement parameters to end-user wireless devices 151 and 152. The updated measurement parameters may include A4 measurement parameters, indicating threshold signal levels and hysteresis levels for reporting measurements of other reference signals. The other reference signals may be transmitted, for instance, by donor access node 110, neighboring access node 120, or relay node 140. Based on the updated measurement parameters, end-user wireless devices 151 and 152 monitor these other signal levels. The measurement may be, for instance, of a reference signal broadcast or otherwise transmitted from either of access nodes 110, 120, or relay access node 140 and measured at one or more of end-user wireless devices 151, 152, and 153. The measurement can include a reference signal receive power (RSRP), signal-to-noise ratio (SNR), signal-to-interference noise radio (SINR), reference signal received quality (RSRQ), etc. If an A4 event is triggered, end-user wireless devices 151 and 152 transmit the measurements to relay node 130 for a handover determination. For example, the transmitted measurement can also include an identifier of the access node generating the measured reference signal. The identifier can include a unique physical cell identifier (PCI) of the access node, or of a specific cell deployed by the access node. For instance, depending on the type of node, an access node can deploy more than one cell, each of which has a unique PCI. Therefore, relay node 130 is able to determine an identity of the access node generating the measured reference signal using the PCI. Based on the identifier, Relay node 130 may determine whether or not to execute the handover. If relay node 130 determines that a handover is necessary, one or more of end-user wireless devices 151, 152 may be off-loaded to access node 110, neighbor access node 120 or relay node 140. Alternatively, or in addition, the access node may offload the one relay node 130 to neighbor access node 120.

In an embodiment, relay node 130 can be configured to function as one or more of a layer 1 (L1), layer 2 (L2), or layer 3 (L3) relay. A layer 1 relay functions as a booster or repeater. In other words, a layer 1 relay device performs an amplify and forward (AF) function. RF signals received from donor access node 110 are amplified and transmitted respectively by relay node 130 to wireless devices 151, 152. Likewise, RF signals received from wireless devices 151, 152 are amplified and transmitted by relay node 130 respectively to donor access node 110. Alternatively, or in addition, a layer 2 relay device performs a decode and forward (DF) function. RF signals received from donor access node 110 are demodulated and decoded, then encoded and modulated again before being transmitted by relay node 130 to wireless devices 151, 152. Likewise, RF signals received from wireless devices 151, 152 are demodulated and decoded, then encoded and modulated again before being transmitted by relay node 130 to donor access node 110. Alternatively, or in addition, a layer 3 relay device also performs a decode and forward function. However, a layer 3 relay device also performs additional processing (such as ciphering and/or data concatenation/segmentation/reassembly). In other words, relay node 130 performs demodulation and decoding of the received RF signals (either uplink or downlink), processes received data, then encodes, modulates, and transmits the data to wireless devices 151, 152.

Wireless devices 150, 151, 152, 153 may be any device, system, combination of devices, or other such communication platform capable of communicating wirelessly with relay node 130 or access nodes 110, 120 using one or more frequency bands deployed therefrom. Wireless devices 150, 151, 152, 153 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access nodes 110, 120 or relay node 130, 140, 160. Other types of communication platforms are possible.

Communication network 101 may be a wired and/or wireless communication network. Communication network 101 may include processing nodes, routers, gateways, and physical and/or wireless data links for communicating signals among various network elements. Communication network 101 may include one or more of a local area network, a wide area network, and an internetwork (including the Internet). Communication network 101 may be capable of communicating signals, for example, to support voice, push-to-talk, broadcast video, and data communications by wireless devices 150-153. Wireless network protocols may include one or more of Multimedia Broadcast Multicast Services (MBMS), code division multiple access (CDMA) 1×RTT (radio transmission technology), Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), Third Generation Partnership Project Long Term Evolution (3GPP LTE), Fourth Generation broadband cellular (4G, LTE Advanced, etc.), and Fifth Generation mobile networks or wireless systems (5G or 5G LTE). Wired network protocols utilized by communication network 101 may include one or more of Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 may include additional base stations, controller nodes, telephony switches, internet routers, network gateways, computer systems, communication links, or other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long-Term Evolution (LTE), or combinations thereof. Communications links 106, 107 may include Si communications links. Other wireless protocols can also be used. Communication links 106, 107 can be a direct link or might include various equipment, intermediate components, systems, and networks. Communication links 106, 107 may comprise many different signals sharing the same link Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long-Term Evolution (LTE) and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long-Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing access node characteristics. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Access nodes 110, 120 and relay nodes 130, 140, 160 can be any network node configured to provide communication between wireless devices 150, 151, 152, 153 and communication network 101, including standard access nodes and/or short range, low power, small access nodes. For instance, access nodes 110, 120 may include any standard access node, such as a macrocell access node, base transceiver station, a radio base station, an eNodeB device, an enhanced eNodeB device, or the like. In an exemplary embodiment, a macrocell access node can have a coverage area 111, 121 in the range of approximately five kilometers to thirty-five kilometers and an output power in the tens of watts. Relay nodes 130, 140, 160 can be a small access node including a microcell access node, a picocell access node, a femtocell access node, or the like such as a home NodeB or a home eNodeB device. Moreover, it is noted that while access nodes 110, 120 and relay nodes 130, 140, 160 are illustrated in FIG. 1, any number of access nodes and relay nodes can be implemented within system 100.

Access nodes 110, 120 and relay nodes 130, 140, 160 can comprise a processor and associated circuitry to execute or direct the execution of computer-readable instructions to obtain information as further described with reference to FIGS. 2-4. Briefly, access nodes 110, 120 and relay nodes 130, 140, 160 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. See, for example, FIGS. 2-4 describing components of donor access nodes and relay nodes. Further, access nodes 110, 120 and relay node 130, 140, 160 can receive instructions and other input at a user interface. Access nodes 110, 120 communicate with gateway node 102 and controller node 104 via communication links 106, 107.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access nodes 110, 120 and communication network 101

Figure 2:
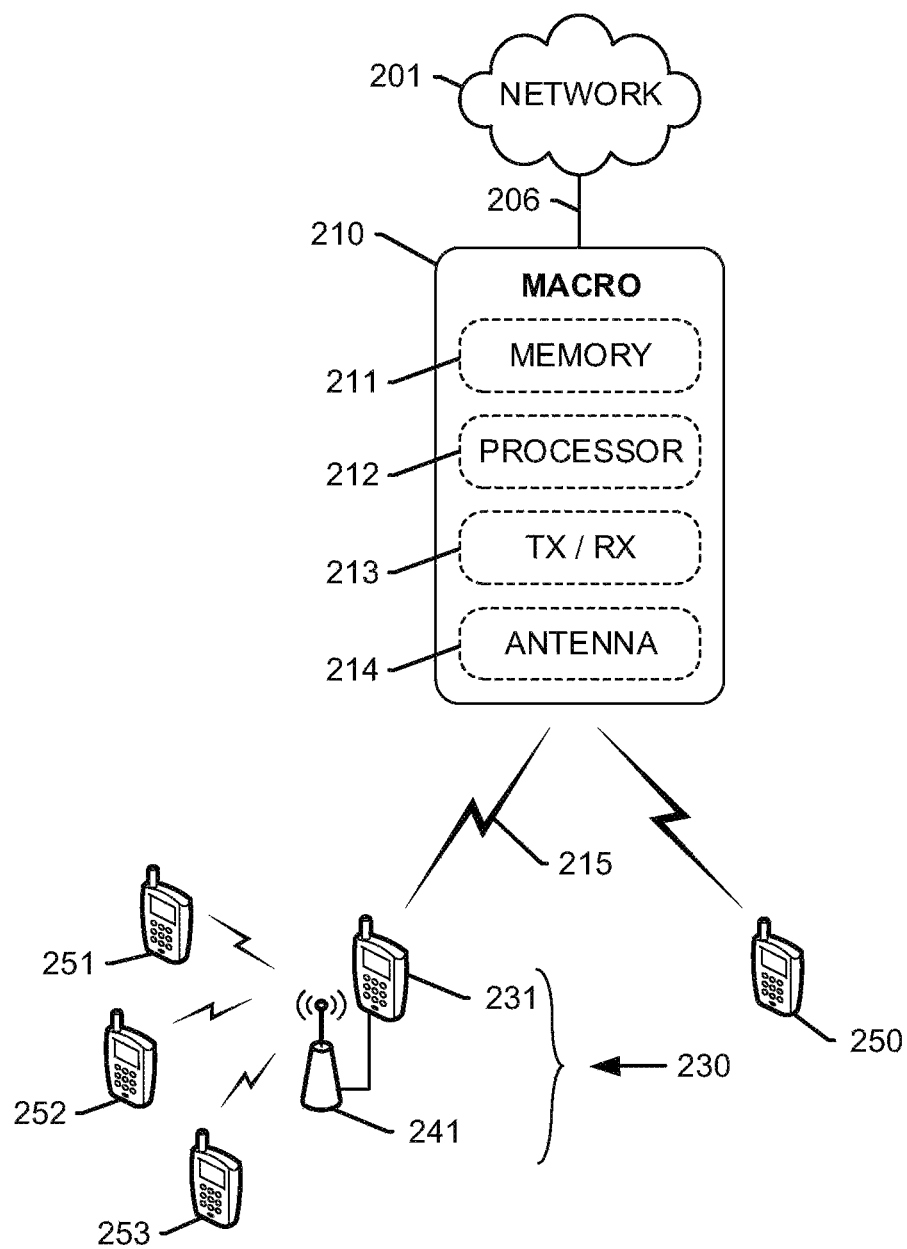
FIG. 2 depicts an exemplary system.

FIG. 2 depicts an exemplary donor access node 210 for traffic management of wireless devices attached to a relay node. Donor access node 210 may be a macro-cell access node as described above, or simply "macro". Macro 210 is configured as an access point for providing network services from network 201 directly to end-user wireless device 250 and relayed via relay node 230 to end-user wireless devices 251, 252, 253. Macro 210 is illustrated as comprising a memory 210 for storing logical modules that perform traffic management operations described herein, a processor 212 for executing the logical modules, a transceiver 213, and an antenna 214 for communication with wireless device 250 and relay node 230. Further, macro 210 is communicatively coupled to network 201 via communication interface 206, which may be any wired or wireless link as described above. Although only one transceiver and antenna combination is depicted in macro 210, additional transceivers and antennas may be incorporated in order to deploy multiple frequency bands and to facilitate communication across other network nodes that are not shown, such as gateways, controllers, and other access nodes. In operations described herein, macro 210 monitors backhaul link 215 to determine whether or not it is contributing to a latency and congestion in an air interface of macro 210. The macro 210 further determines whether to trigger traffic management operations.

Figure 3:
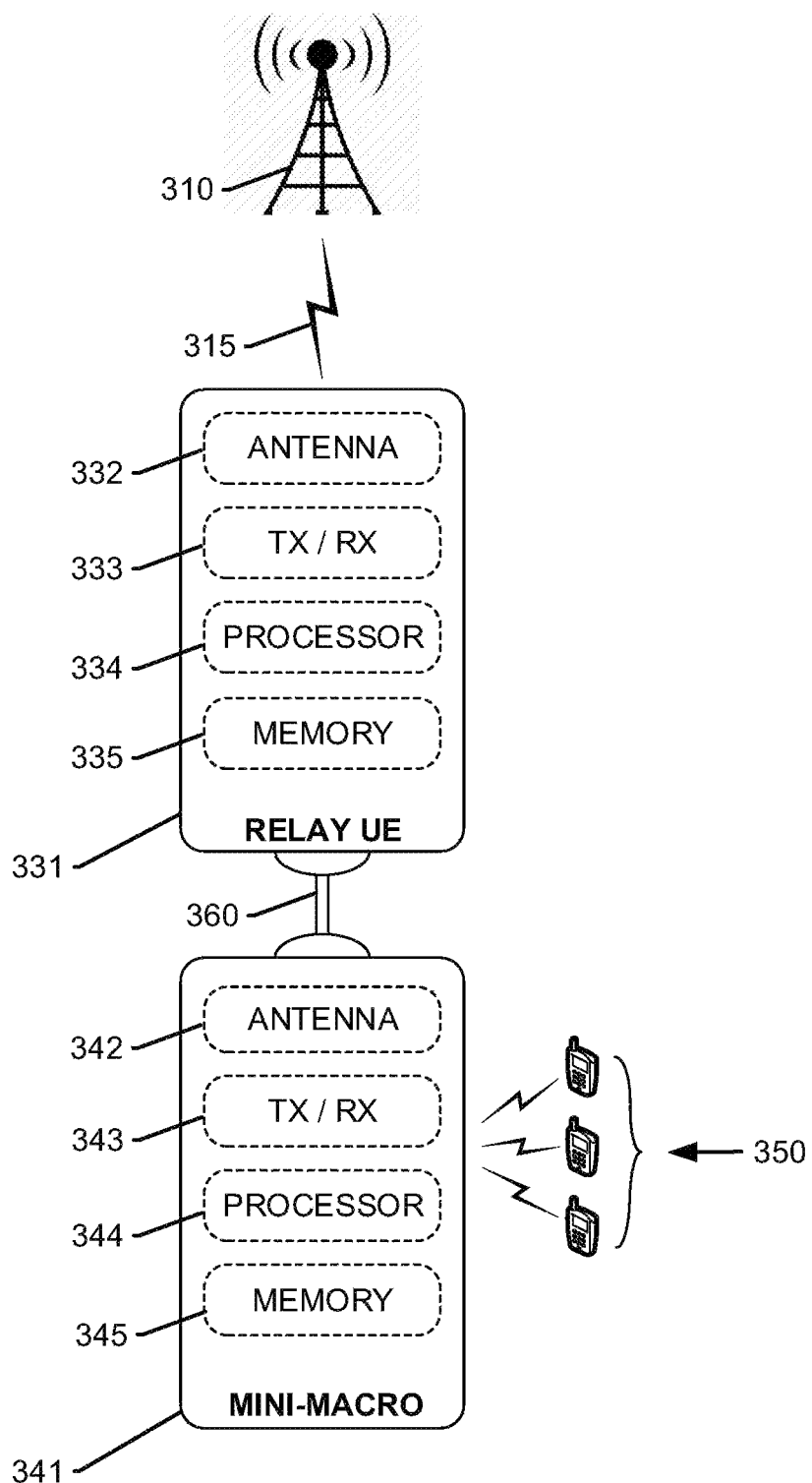
FIG. 3 depicts an exemplary relay node comprising a separate relay wireless device and mini-macro access node.
Figure 4:
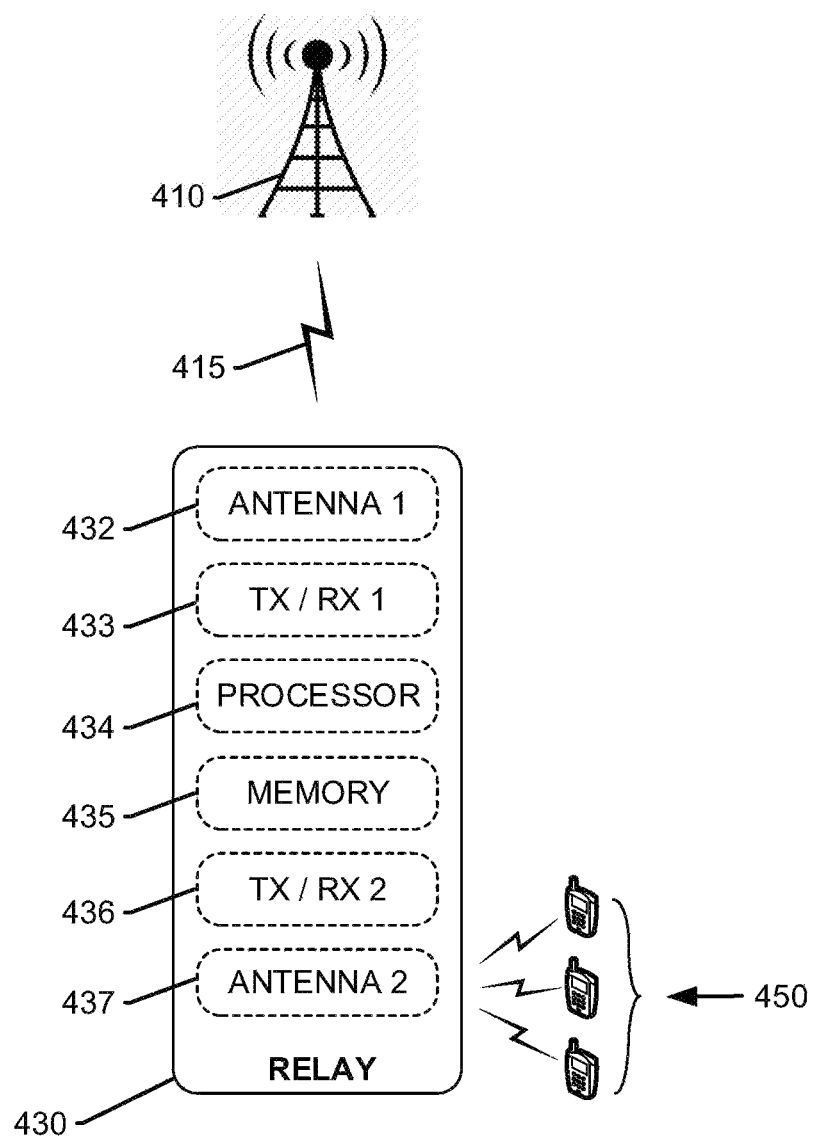
FIG. 4 depicts an exemplary relay node comprising a combined wireless device and mini-macro access node.

FIGS. 3 and 4 depict alternate configurations of a relay node. For example, FIG. 3 depicts an exemplary relay node comprising a separate relay wireless device (UE) 331 and a mini-macro access node 341. Relay wireless device 331 provides a communication path between relay access node 341 and donor access node 310 via relay backhaul 315. Relay wireless device 331 is illustrated as comprising an antenna 332 for direct (i.e. unrelayed) communication with access node 310 via communication link 315, a transceiver 333, a processor 334, and a memory 335 for storing logical modules that are executed by processor 334 to perform operations further described herein. Further, relay wireless device 331 is coupled to mini-macro access node 341 via a communication interface 360. Communication interface 360 may be any interface that enables direct communication between relay wireless device 331 and mini-macro 341, such as USB, FireWire, Ethernet, or any other serial, parallel, analog, or digital interface. Mini-macro 341 is illustrated as comprising an antenna 342 for wireless communication with end wireless devices 350, a transceiver 343, a processor 344, and a memory 345 for storing logical modules for performing traffic management operations described herein. Although only one transceiver is depicted in each of relay wireless device 331 and mini-macro 341, additional transceivers may be incorporated in order to facilitate communication across interface 360 and other network elements.

In an alternate embodiment, FIG. 4 depicts an exemplary relay node 430 comprising a combined relay node and a mini-macro access node. Relay node 430 is illustrated as comprising a first antenna 432 for direct communication with donor access node 410 via communication link 415, a first transceiver 433, a processor 434, a memory 435 for storing logical modules for enabling relay node 430 to perform traffic management modules described herein, a second transceiver 436, and a second antenna 437 for wireless communication with end-user wireless devices 450. Although only two transceivers are depicted in relay access node 430, additional transceivers may be incorporated in order to facilitate communication with other network elements.

Figure 5:
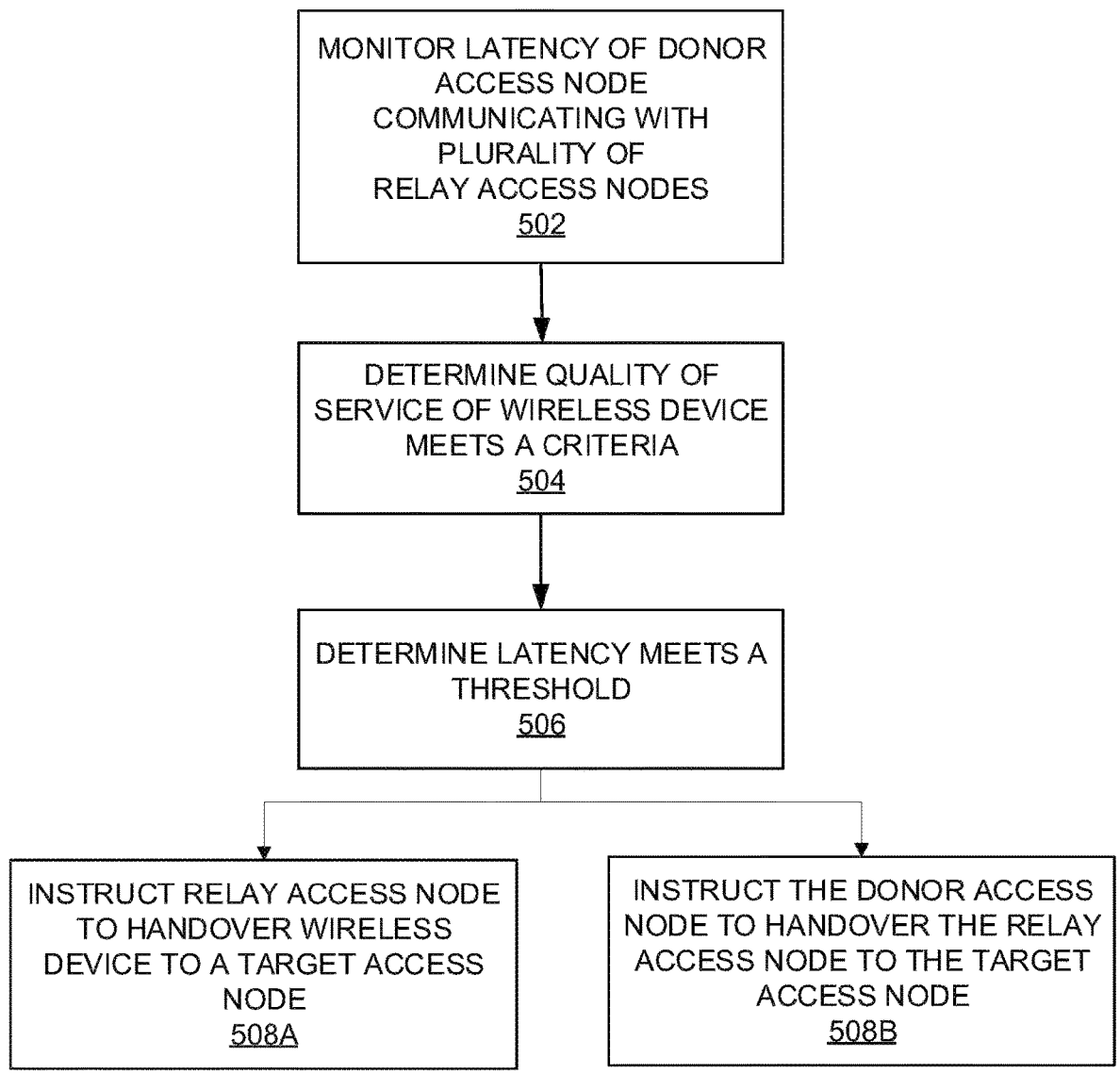
FIG. 5 depicts an exemplary method for managing handover between relay access nodes.

FIG. 5 depicts a method 500 which may be performed by the system 100. Referring to FIG. 5, in 502, a latency of the donor access node communicating with a first relay access node and second relay access node is monitored. In 504, a quality of service corresponding to a wireless device communicating with a relay access node of the plurality of relay access nodes meets a quality of service criteria. For example, the quality of service criteria corresponds to a guaranteed bit rate, voice call traffic, or real-time traffic. In 506, the system determines a latency meets a threshold. For example, the latency threshold may be a latency at which prevents the system 100 from meeting a QoS of a wireless device 151, 152, 153.

In 508A, the relay access node is instructed to handover the wireless device to a target access node in response to the latency meeting the threshold. For example, the wireless device is handed over to the target access node which may be the donor access node, a neighboring access node, or a second relay access node served by the neighboring access node. Prior to selecting the target access node for hand off of the wireless device, the capabilities of candidate target access nodes are determined. For example, at least one of a load, a latency, a reference signal strength for each candidate access node is determined. The determined at least one of a load, a latency, and a reference signal strength for each candidate access node are compared with a handover criteria. The handover criteria may be based on latency, load, reference signal strength. The candidate target access node meeting the handover criteria may be selected as the target access node for the wireless device. For example, a candidate target access node having a lowest latency and load, and strongest reference signal strength, as compared to the other candidate target access nodes, may meet the handover criteria.

Alternatively, in 508B, the donor access node is instructed to handover the relay access node to handover the target access node. For example, relay access node is handed over to the target access node, which may be the neighboring access node. Accordingly, wireless devices 151, 152, are able to access network services from access node 120 relayed via relay node 130 and backhaul 125. Prior to selecting the target access node for hand off of the relay access node, the capabilities of candidate target access nodes are determined. For example, whether the candidate target access node can serve a donor access node and at least one of a load, a latency, and a reference signal strength for each candidate access node are determined. The determined capabilities of the candidate target access nodes are compared with a handover criteria. The candidate target access node meeting the handover criteria may be selected as the target access node for the relay access node. For example, a candidate target access node capable of serving as a donor access node and having a lowest latency and load, and strongest reference signal strength, as compared to the other candidate target access nodes, may meet the handover criteria.

By handing over the wireless device or relay access node according to method 500, latencies present in the donor access node or relay access node may be avoided. The method 500 may further prevent the end-user wireless device from being repeatedly handed off between the two relay access nodes being served by the same donor access node, further avoiding additional load on the donor access node and latencies within the network.

Figure 6:
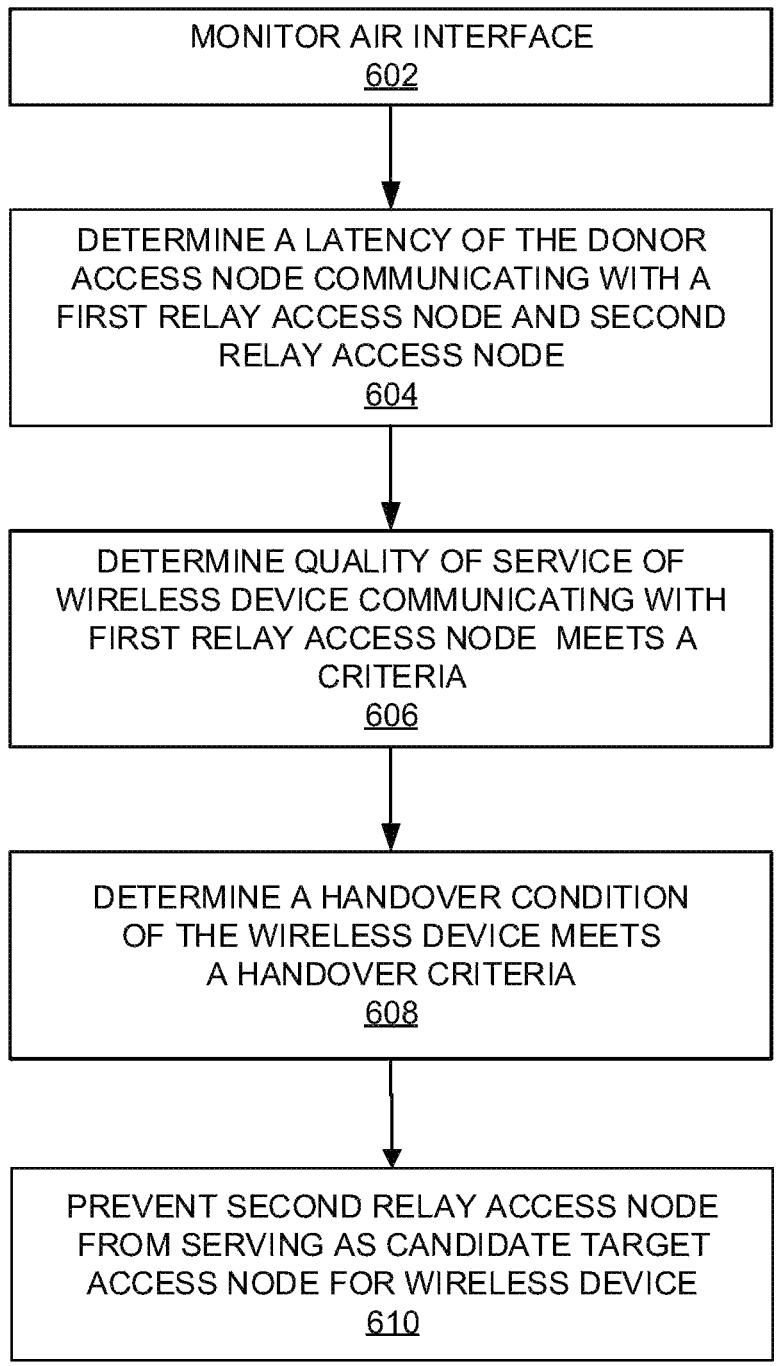
FIG. 6 depicts an exemplary method for managing traffic between relay access nodes communicating with a donor access node.

FIG. 6 depicts a method 600 of managing traffic between relay access nodes communicating with a donor access node. For example, the system 100 of FIG. 1 may perform the method 600. Referring to FIG. 6, in 602, the system 100 monitors the air interface. In 604, a latency of the donor access node communicating with a first relay access node and a second relay access node is determined. In 606, a quality of service (QoS) corresponding to a wireless device communicating with the first relay access node meets a quality of service criteria is determined. For example, the quality of service criteria corresponds to a guaranteed bit rate, voice call traffic, or real-time traffic. In 608, a handover condition of the wireless device meeting a handover criteria is determined. For example, the handover criteria includes a latency meeting a threshold. The latency threshold may be a latency at which prevents the system 100 from meeting a QoS assigned to end-user wireless device 151, 152, 153.

In 610, the second relay access node is prevented from serving as a candidate target access node for the wireless device. For example, a blacklist is updated to include the second relay access node, wherein the blacklist corresponds to a list of access nodes to which handover is prohibited. For example, the wireless device 151 may be handed over to a target access node, which may be the donor access node 110, a neighboring access node 120, or a relay access node 140 served by the neighboring access node 120 via air interface, or backhaul, 145. As a further example, a relay access node 160 served by donor access node 110 is prohibited from serving as a target access node for wireless device 151.

By handing over the wireless device according to method 600, latencies experienced by the end user wireless device due to processing delays at the donor access node communicating with a plurality of relay access node may be avoided. The method 600 may further avoid the end-user wireless device from being repeatedly handed off between the two relay access nodes being served by the same donor access node, further avoiding additional load on the donor access node and latencies within the network.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access nodes 110, 120, relay access node 130, 140, 160, wireless device 350, mini-macro 341, and/or network 101.

Figure 7:
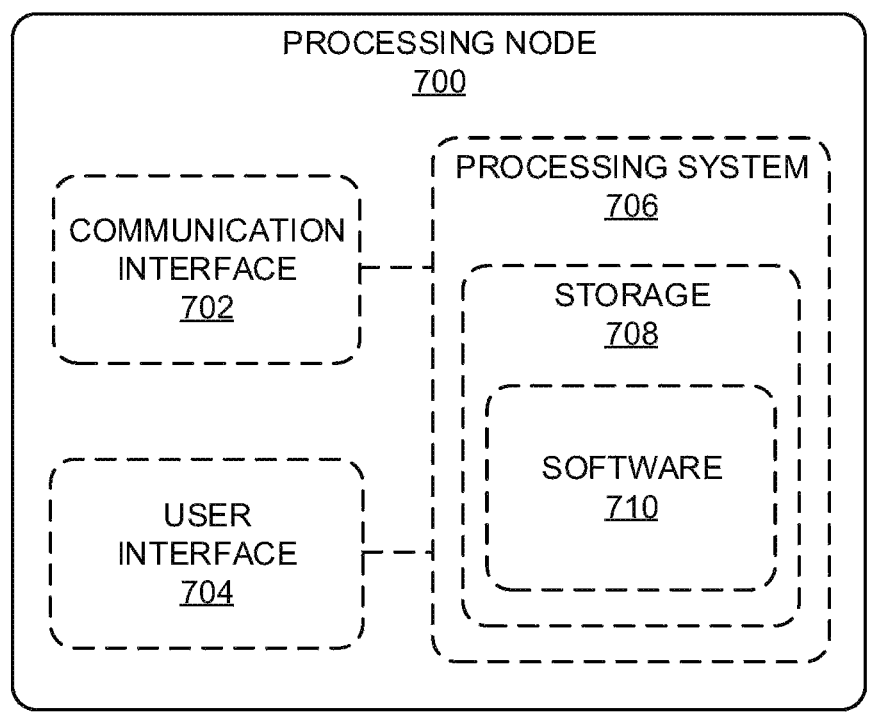
FIG. 7 depicts an exemplary processing node.

FIG. 7 depicts an exemplary processing node 700 comprising communication interface 702, user interface 704, and processing system 706 in communication with communication interface 702 and user interface 704. Processing system 706 includes storage 708, which can comprise a disk drive, flash drive, memory circuitry, or other memory device. Storage 708 can store software 710 which is used in the operation of the processing node 700. Storage 708 may include a disk drive, flash drive, data storage circuitry, or some other memory apparatus. For example, storage 708 may include a buffer. Software 710 may include computer programs, firmware, or some other form of machine-readable instructions, including an operating system, utilities, drivers, network interfaces, applications, or some other type of software. For example, software 710 may include a scheduling module. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of managing traffic between relay access nodes communicating with a donor access node, the method comprising:
   determining a latency of the donor access node communicating with a first relay access node and second relay access node meets a threshold;
   determining a quality of service corresponding to a wireless device communicating with the first relay access node meets a quality of service criteria;
   determining a handover condition of the wireless device meets a handover criteria based on the latency of the donor access node meeting the threshold and the quality of service meeting the quality of service criteria;
   preventing, by adding to a blacklist, the second relay access node and every relay access node served by the donor access node from serving as a candidate target access node for the wireless device, wherein the blacklist corresponds to a list of access nodes to which handover is prohibited; and
   looking for a candidate target access node not served by the donor access node.

2. The method of claim 1, wherein the list of access nodes to which handover is prohibited is updated to include relay access nodes being served by the donor access node.

3. The method of claim 1, further comprising instructing the first relay access node to handover the wireless device to a third relay access node communicating with a second donor access node.

4. The method of claim 1, further comprising instructing the first relay access node to handover the wireless device to a second access node.

5. The method of claim 1, further comprising instructing the donor access node to handover the first relay access node to a second donor access node.

6. The method of claim 1, further comprising:
   comparing at least one of a load, latency, and reference signal strength for each of a plurality of candidate access nodes with a target criteria; and
   selecting from the plurality of candidate access nodes a target access node meeting the target criteria.

7. The method of claim 1, wherein the quality of service criteria corresponds to a guaranteed bit rate, voice call traffic, or real-time traffic.

8. A system for managing traffic between relay access nodes, the system comprising:
   a donor access node for providing network services to an end-user wireless device;
   a first relay access node for relaying the network services between the donor access node and the end-user wireless device; and
   a processor communicatively coupled to the donor access node, the processor configured to:
     determine a quality of service corresponding to the end-user wireless device meets a quality of service criteria;
     determine a latency of the donor access node communicating with the first relay access node meets a threshold;
     determine a second relay access node is communicating with the donor access node;
     determine a handover condition of the end-user wireless device meets a handover criteria based on the latency of the donor access node meeting the threshold and the quality of service meeting the quality of service criteria;
     prevent, by adding to a blacklist, the second relay access node communicating with the donor access node and every relay access node served by the donor access node, from serving as the candidate target access node, wherein the blacklist corresponds to a list of access nodes to which handover is prohibited; and
     look for a candidate target access node not served by the donor access node.

9. The system of claim 8, wherein the processor is further configured to update the blacklist corresponding to the list of access nodes to which handover is prohibited.

10. The system of claim 8, wherein the processor is further configured to instruct the first relay access node to handover the end-user wireless device to a third relay access node communicating with a second donor access node.

11. The system of claim 8, wherein the processor is further configured to instruct the first relay access node to handover the end-user wireless device to a second donor access node.

12. The system of claim 8, wherein the processor is further configured to:
   determine at least one of a load, a latency, and a reference signal strength for each of a plurality of candidate access nodes.

13. The system of claim 12, wherein the processor is further configured to:
   compare the determined at least one of the load, latency, and reference signal strength for each of the plurality of candidate access nodes with a target criteria; and
   selecting from the plurality of candidate access nodes a target access node meeting the target criteria.

14. The system of claim 8, wherein the quality of service criteria corresponds to a guaranteed bit rate, voice call traffic, or real-time traffic.

* * * * *